US008843872B1

(12) United States Patent  (10) Patent No.: US 8,843,872 B1
Chang et al.  (45) Date of Patent: Sep. 23, 2014

(54) AUTOMATIC CLOCK TREE SYNTHESIS EXCEPTIONS GENERATION

(71) Applicant: Synopsys, Inc., Mountain View, CA (US)

(72) Inventors: Ssu-Min Chang, Cupertino, CA (US); Aiqun Cao, Sunnyvale, CA (US); Cheng-Liang Ding, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/066,324

(22) Filed: Oct. 29, 2013

Related U.S. Application Data

(60) Provisional application No. 61/792,688, filed on Mar. 15, 2013.

(51) Int. Cl.
*G06F 17/50* (2006.01)

(52) U.S. Cl.
CPC .................................. *G06F 17/5031* (2013.01)
USPC ........... 716/132; 716/113; 716/133; 716/134; 716/135; 716/136

(58) Field of Classification Search
USPC ......................................... 716/113, 132–136
See application file for complete search history.

(56) References Cited

U.S. PATENT DOCUMENTS

| | | | | |
|---|---|---|---|---|
| 5,452,239 A * | 9/1995 | Dai et al. | ......................... | 703/19 |
| 5,911,063 A * | 6/1999 | Allen et al. | .................... | 713/500 |
| 5,963,730 A * | 10/1999 | Toyonaga et al. | ............. | 716/102 |
| 6,052,811 A * | 4/2000 | Ahsuri | ......................... | 714/745 |
| 6,071,003 A * | 6/2000 | Ashuri et al. | .................. | 716/114 |
| 6,367,060 B1 | 4/2002 | Cheng et al. | | |
| 6,434,731 B1 * | 8/2002 | Brennan et al. | ................ | 716/122 |
| 6,550,045 B1 * | 4/2003 | Lu et al. | ........................ | 716/114 |
| 6,564,353 B2 * | 5/2003 | Sano | .............................. | 716/114 |
| 6,728,917 B2 * | 4/2004 | Abramovici et al. | ......... | 714/744 |
| 6,763,505 B2 * | 7/2004 | Baumgartner et al. | ....... | 716/108 |
| 6,807,660 B1 * | 10/2004 | Frenkil | ......................... | 716/109 |
| 6,822,481 B1 * | 11/2004 | Srikantam et al. | .............. | 326/93 |
| 7,017,096 B2 * | 3/2006 | Abramovici et al. | ......... | 714/738 |
| 7,406,672 B2 * | 7/2008 | Fukuda | ......................... | 716/108 |
| 7,447,961 B2 * | 11/2008 | Tan | ............................... | 714/726 |
| 7,546,567 B2 * | 6/2009 | Cheon et al. | .................. | 716/113 |
| 7,555,689 B2 * | 6/2009 | Goswami et al. | ............. | 714/741 |
| 7,624,364 B2 * | 11/2009 | Albrecht et al. | .............. | 716/113 |
| 7,810,061 B2 * | 10/2010 | Minonne et al. | .............. | 716/113 |
| 8,171,440 B2 * | 5/2012 | Kanno | .......................... | 716/108 |
| 8,205,182 B1 * | 6/2012 | Zlatanovici et al. | .......... | 716/125 |
| 8,302,047 B2 * | 10/2012 | Buss et al. | ..................... | 716/108 |
| 8,336,012 B2 * | 12/2012 | Fry et al. | ....................... | 716/113 |
| 8,384,436 B2 | 2/2013 | Peng | | |

(Continued)

*Primary Examiner* — Naum Levin
(74) *Attorney, Agent, or Firm* — Park, Vaughan, Fleming & Dowler LLP; Laxman Sahasrabuddhe

(57) ABSTRACT

Systems and techniques are described for automatically generating clock tree synthesis (CTS) exceptions. The process can use on one or more criteria to identify sequential circuit elements that can be ignored during clock skew minimization. For example, the process can identify sequential circuit elements whose clock skew cannot be balanced with other sequential circuit elements due to structural reasons, identify sequential timing elements that do not have a timing relationship with other sequential timing elements in the clock tree, and/or identify sequential circuit elements whose data pins have a sufficiently large slack so that clock skew is not expected to cause timing violations at any of the data pins. Next, the process can generate clock tree exceptions based on the identified sequential circuit elements.

9 Claims, 3 Drawing Sheets

(56) References Cited

U.S. PATENT DOCUMENTS

| | | | |
|---|---|---|---|
| 8,413,099 B2 | 4/2013 | Mottaez et al. | |
| 8,578,310 B2* | 11/2013 | Kalafala et al. | 716/108 |
| 8,635,579 B1* | 1/2014 | Cao et al. | 716/134 |
| 2001/0054171 A1* | 12/2001 | Furumoto et al. | 716/6 |
| 2007/0106970 A1* | 5/2007 | Fukuda | 716/6 |
| 2010/0083206 A1* | 4/2010 | Negishi | 716/6 |
| 2011/0066990 A1* | 3/2011 | Ono | 716/108 |
| 2012/0047477 A1* | 2/2012 | Kalafala et al. | 716/108 |
| 2012/0240091 A1 | 9/2012 | Sunder et al. | |
| 2012/0304136 A1* | 11/2012 | Ge et al. | 716/108 |

* cited by examiner

AUTOMATIC CLOCK TREE SYNTHESIS EXCEPTIONS GENERATION

RELATED APPLICATION

This application claims priority to U.S. Provisional Patent Application No. 61/792,688, entitled "Automatic CTS exceptions," by the same inventors, filed on 15 Mar. 2013, the contents of which are herein incorporated by reference in their entirety for all purposes.

BACKGROUND

1. Technical Field

This disclosure relates to clock tree synthesis during electronic circuit design. More specifically, this disclosure relates to automatic clock tree synthesis exceptions generation.

2. Related Art

Advances in semiconductor technology presently make it possible to integrate hundreds of millions of transistors onto a single semiconductor chip. This dramatic increase in semiconductor integration densities has made it considerably more challenging to design circuits.

Clock tree synthesis (CTS) is an important step in electronic design automation (EDA) that refers to the process of creating a clock distribution network for distributing a clock signal to a set of sequential circuit elements in a circuit design. The quality of the clock trees that is generated by CTS can have a significant impact on downstream steps in the EDA design flow.

SUMMARY

Some embodiments described herein automatically generate CTS exceptions. A CTS exception instructs the CTS engine to ignore one or more sequential circuit elements during clock skew minimization. Once the CTS exceptions for a circuit design have been generated, CTS can be performed on the circuit design by using the CTS exceptions.

Some embodiments described herein use on one or more criteria to identify sequential circuit elements that can be ignored during clock skew minimization. Specifically, some embodiments can identify sequential circuit elements whose clock skew cannot be balanced with other sequential circuit elements due to structural reasons, identify sequential timing elements that do not have a timing relationship with other sequential timing elements in the clock tree, and/or identify sequential circuit elements whose data pins have a sufficiently large slack so that clock skew is not expected to cause timing violations at any of the data pins. Next, the embodiments can generate clock tree exceptions based on the identified sequential circuit elements.

DETAILED DESCRIPTION

Figure 1:
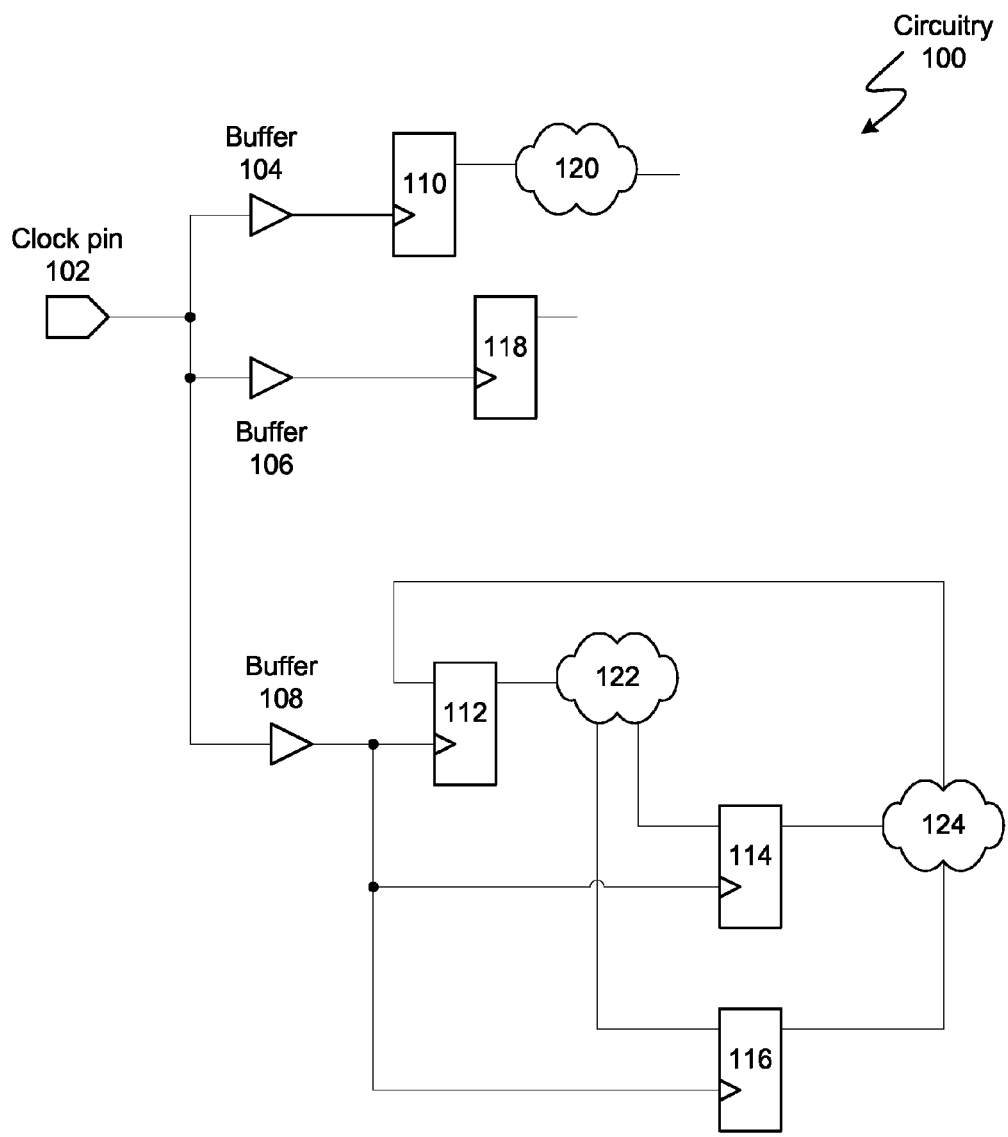
FIG. 1 illustrates synchronous circuitry in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Clock Trees

Synchronous circuit designs can be viewed as a collection of sequential circuit elements that are electrically connected via combinational logic clouds. For example, FIG. 1 illustrates synchronous circuitry in accordance with some embodiments described herein. Circuitry 100 includes buffers 104, 106, 107, and 108, sequential circuit elements 110, 112, 114, 116, and 118, and combinational logic clouds 120, 122, and 124. A clock signal is distributed from clock pin 102 to sequential circuit elements 110, 112, 114, 116, and 118 via a clock tree that includes buffers 104, 106, 107, and 108. A sequential circuit element is generally any element that performs an operation based on a clock signal. For example, a flip-flop is a sequential circuit element. A combinational logic cloud includes one or more combinational logic gates (e.g., AND gates, OR gates, NOT gates, XOR gates, multiplexers, demultiplexers, buffers, repeaters, etc.), but does not include any sequential circuit elements.

Data transfer between sequential circuit elements is synchronized using one or more clock signals. For example, sequential circuit element 110 can launch a signal that passes through combinational logic cloud 120 (which may logically combine the signal with other signals), and which can then be captured by sequential circuit element 118. The launch and capture are synchronized based on the clock signal that is provided to sequential circuit elements 110 and 118.

A clock tree comprises circuitry that distributes a clock signal to one or more sequential circuit elements in the circuit design. For example, the clock tree shown in FIG. 1 includes buffers 104, 106, 107, and 108, and electrically connects clock pin 102 to the clock input pins of sequential circuit elements 110, 112, 114, 116, and 118. A clock domain can refer to a portion of a circuit design that is clocked using a given clock signal. For example, circuitry 100 shown in FIG. 1 is part of the clock domain that corresponds to the clock signal that is distributed from clock pin 102. A circuit design may include multiple clock domains, and each clock domain can include multiple clock trees.

Process for Automatically Generating CTS Exceptions

The goal of CTS is to create an optimal clock tree. According to one definition, an optimal clock tree is a clock tree that minimizes clock skew while satisfying timing, area, and leakage power constraints. In general, a clock tree optimization problem becomes harder as the size of the clock tree increases. Furthermore, if CTS generates a clock tree that includes clock pins for which balancing clock skew was not necessary, then the generated clock tree is unlikely to be as optimal as a clock tree that would have been generated by the CTS engine if the CTS engine had ignored clock pins for which balancing clock skew was not necessary. Therefore, it is beneficial to identify pins that can be ignored for clock skew minimization during CTS. Each pin that can be ignored for clock skew minimization during CTS is called a "CTS exception." Some embodiments described in this disclosure automatically generate CTS exceptions. A few situations in which a pin can be ignored for clock skew minimization are now described.

Figure 2:
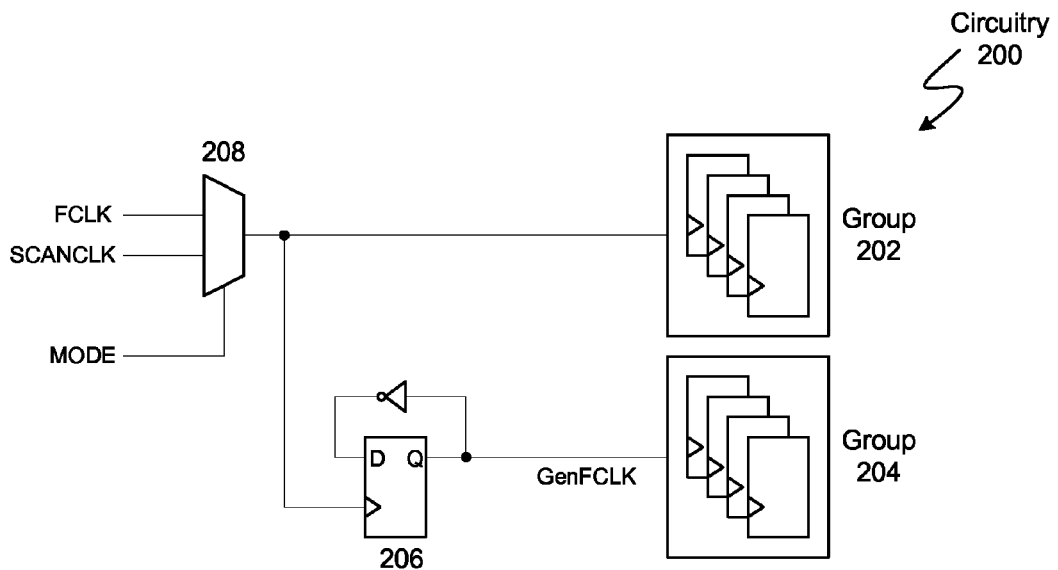
FIG. 2 illustrates a situation where it is structurally impossible to balance the clock tree in accordance with some embodiments described herein.

In some situations it is structurally impossible to balance the clock tree (i.e., structurally impossible to minimize the skew across the clock tree). This situation can occur when a sequential circuit element is being used to generate a clock (e.g., when the sequential circuit element is being used as a clock divider). FIG. 2 illustrates a situation where it is structurally impossible to balance the clock tree in accordance with some embodiments described herein. Circuitry 200 includes two groups of sequential circuit elements: groups 202 and 204. Multiplexer 208 receives two clock signals: FCLK (this clock is used during normal functioning of circuitry 200) and SCANCLK (this clock is used for testing circuitry 200). Select input "MODE" determines which clock signal is outputted by multiplexer 208. Specifically, depending on the mode of operation of circuitry 200 (e.g., "normal" or "test"), multiplexer 208 outputs the appropriate clock on its output pin.

Group 202 is clocked using the output of multiplexer 208. Group 204 is clocked using clock signal GenFCLK that is generated by sequential circuit element 206 based on clock signal FCLK. In the example shown in FIG. 2, the frequency of clock signal GenFCLK is half of the frequency of clock signal FCLK.

Note that the functional clock signal FCLK and the scan clock signal SCANCLK have conflicting clock skew balancing requirements. Specifically, for SCANCLK, the clock skew needs to be balanced between sequential circuit elements in group 202 and sequential circuit element 206. In other words, for SCANCLK, it is desirable to minimize the clock skew between any two of the following set of sequential circuit elements: sequential circuit element 206 and the sequential circuit elements in group 202. On the other hand, for clock signal FCLK, the clock skew needs to be balanced between sequential circuit elements in groups 202 and 204. In other words, for FCLK, it is desirable to minimize the clock skew between any two of the following set of sequential circuit elements: sequential circuit elements in groups 202 and 204. Note that, these two clock skew balancing requirements imply minimizing the clock skew between any two of the following set of sequential circuit elements: sequential circuit element 206 and the sequential circuit elements in group 204. However, that is structurally impossible because the sequential circuit elements in group 204 are clocked using the output from sequential circuit element 206.

Therefore, in such situations, some embodiments described herein create a CTS exception for sequential circuit element 206 when the clock tree is being balanced for clock signal SCANCLK. The CTS exception instructs the CTS engine to ignore the clock input of sequential circuit element 206 when clock skew is being minimized for SCANCLK.

Another situation in which a pin can be ignored during clock skew minimization is when no timing relationship exists between a sequential circuit element and other sequential circuit elements. A direct timing relationship exists between two sequential circuit elements if one sequential circuit element launches a signal and the other captures the signal (the signal may optionally pass through a combinational logic cloud before being captured). For example, in FIG. 1, sequential circuit element 112 launches a signal that passes through combinational logic cloud 122 (which may logically combine the signal with other signals) and is captured by sequential circuit element 114. Therefore, sequential circuit elements 112 and 114 have a direct timing relationship.

A transitive timing relationship exists between sequential circuit elements $F_1$ and $F_N$ if and only if a series of sequential circuit elements $F_1, F_2, \ldots, F_{N-1}, F_N$ exists such that a direct timing relationship exists between every pair of neighboring sequential circuit elements in the series (i.e., a direct timing relationship exists between sequential circuit elements $F_i$ and $F_{i+1}$, where $1 \leq i \leq N-1$). For example, a direct timing relationship exists between sequential circuit elements 114 and 112 (because sequential circuit element 114 launches a signal that passes through combination logic block 124 and is captured by sequential circuit element 112), and a direct timing relationship exists between sequential circuit elements 112 and 116 (because sequential circuit element 112 launches a signal that passes through combination logic block 122 and is captured by sequential circuit element 116). Therefore, a transitive timing relationship exists between sequential circuit elements 114 and 116. Note that both a direct and a transitive timing relationship may exist between two sequential circuit elements.

However, there are situations where no timing relationship (i.e., neither a direct nor a transitive timing relationship) exists between a sequential circuit element and other sequential circuit elements. For example, no timing relationship exists between sequential circuit element 110 and the other sequential circuit elements. Likewise, no timing relationship exists between sequential circuit element 118 and the other sequential circuit elements. Therefore, some embodiments described herein can generate CTS exceptions for sequential circuit elements 110 and 118 so that these sequential circuit elements can be ignored as far as clock skew minimization is concerned.

In some embodiments, the system can identify sequential circuit elements that do not have any timing relationship with other sequential circuit elements as follows. Each sequential circuit element in the circuit design can be represented by a vertex in a graph, and an edge can be created between two vertices if the corresponding sequential circuit elements have a direct or a transitive timing relationship. Note that a connected component in the graph corresponds to a group of sequential circuit elements that have timing relationship among themselves. Therefore, if a connected component in the graph has only one sequential circuit element, then some embodiments can generate a CTS exception for this sequential circuit element (so that the sequential circuit element is ignored during clock skew minimization).

Yet another situation in which a pin can be ignored during CTS is when the slacks on the data pins of a sequential circuit element are sufficiently large. Specifically, if the slack on the data pins of a sequential circuit element is so large that the clock skew is never expected to cause a timing violation, then the clock pin on the sequential circuit element can be ignored during CTS. During static timing analysis, the arrival times are propagated forward from the timing start-points to the timing end-points, and the required times are propagated backward from the timing end-points to the timing start-points. The slack at a given pin in the circuit design is the difference between the propagated arrival time at the pin and the propagated required time at the pin.

To illustrate arrival times and required times, consider circuitry 100 shown in FIG. 1. Sequential circuit element 112 launches a data signal at a given clock edge. This data signal then passes through logic cloud 122 and arrives at the data input pin of sequential circuit element 114 (this is the arrival time). For correct circuit operation, the data signal must arrive at the data input pin of sequential circuit element 114 at a certain time (this is the required time) before the next clock edge arrives at the clock input of sequential circuit element 114. The setup time of the sequential circuit element 114 dictates the time difference between when the data signal arrives at the data pin and the next clock edge arrives at the clock input pin. A similar timing constraint can be derived based on the hold time for a sequential circuit element.

The difference between the arrival time and the required time at a pin is called the slack at the pin. A negative slack corresponds to a timing violation and needs to be fixed to ensure correct operation of the circuit. A positive slack corresponds to the amount of time by which the arrival time or the required time can worsen (i.e., the arrival time can be delayed or the required time can be moved earlier) without causing a timing violation. Note that both the delay through logic cloud 122 and the clock skew between sequential circuit elements 112 and 114 affect the slack at the data input pin of sequential circuit element 114. If the slack at the data input pin of sequential circuit element 114 is sufficiently large, then it is very unlikely that the clock skew between sequential circuit elements 112 and 114 would cause a timing violation. In such situations, sequential circuit element 114 can be ignored as far as clock skew minimization is concerned.

Some embodiments described herein can determine the minimum slack over all of the data input pins of a sequential circuit element. Next, the embodiments can compare the minimum slack with the maximum clock skew that is expected to exist in the clock tree. If the minimum slack is greater than the maximum clock skew by a threshold amount (the threshold can be zero or can be a positive value), then some embodiments can generate a CTS exception for the sequential circuit element.

Figure 3:
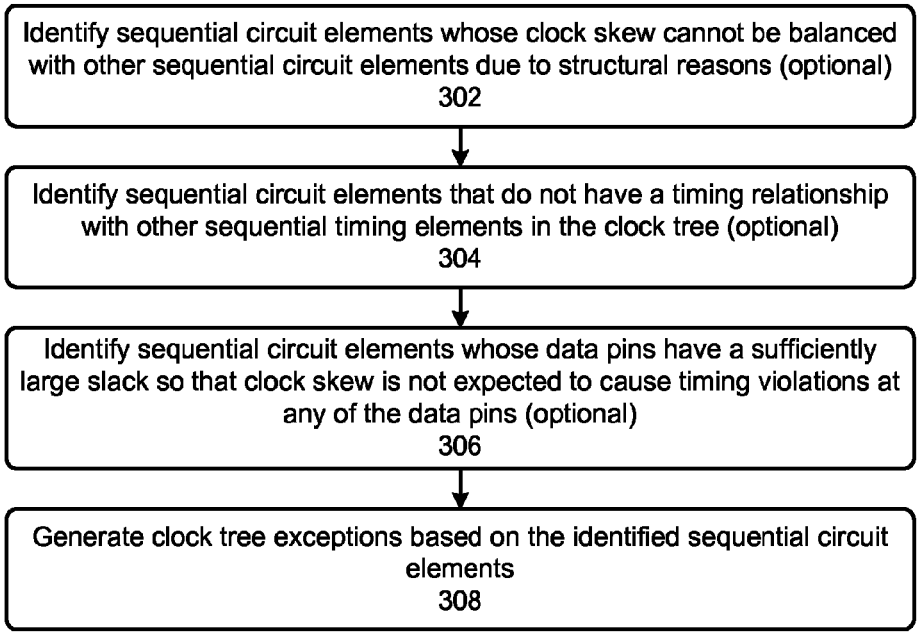
FIG. 3 illustrates a process for generating CTS exceptions in accordance with some embodiments described herein.

FIG. 3 illustrates a process for generating CTS exceptions in accordance with some embodiments described herein. The process can use on one or more criteria to identify sequential circuit elements that can be ignored during clock skew minimization. For example, the process can identify sequential circuit elements whose clock skew cannot be balanced with other sequential circuit elements due to structural reasons (operation 302), identify sequential timing elements that do not have a timing relationship with other sequential timing elements in the clock tree (operation 304), and/or identify sequential circuit elements whose data pins have a sufficiently large slack so that clock skew is not expected to cause timing violations at any of the data pins (operation 306). Next, the process can generate clock tree exceptions based on the identified sequential circuit elements (operation 308).

Computer System

Figure 4:
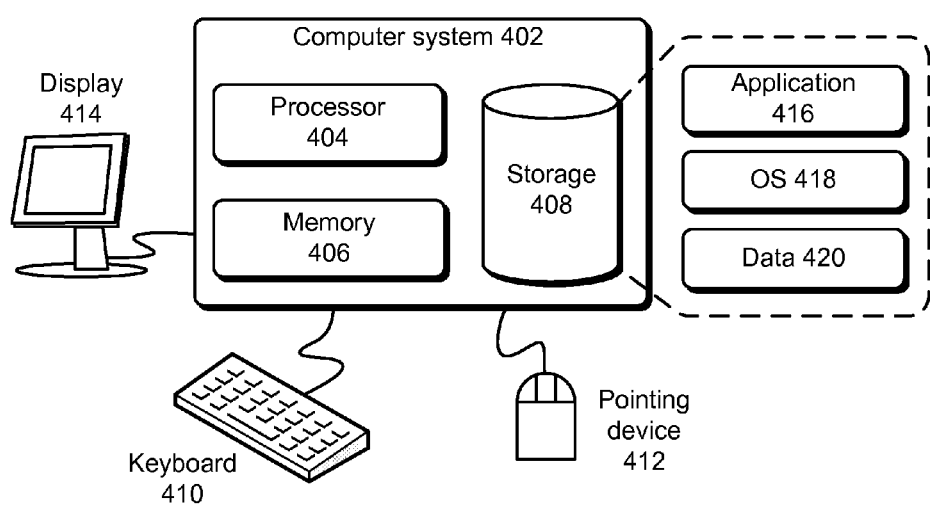
FIG. 4 illustrates a computer system in accordance with some embodiments described herein.

FIG. 4 illustrates a computer system in accordance with an embodiment of the present invention. A computer or a computer system can generally be any system that can perform computations. Specifically, a computer system can be a microprocessor, an application specific integrated circuit, a distributed computing system, a cloud computing system, or any other computing system now known or later developed. Computer system 402 comprises processor 404, memory 406, and storage 408. Computer system 402 can be coupled with display 414, keyboard 410, and pointing device 412. Storage 408 can generally be any device that can store data. Specifically, a storage device can be a magnetic, an optical, or a magneto-optical storage device, or it can be based on flash memory and/or battery-backed up memory. Storage 408 can store application 416, operating system 418, and data 420.

Application 416 can include instructions that when executed by computer 402 cause computer 402 to perform one or more processes that are implicitly or explicitly described in this disclosure. Data 420 can include any data that is inputted into or outputted by application 416.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating clock tree synthesis (CTS) exceptions for a circuit design, the method comprising:
   a computer identifying a set of sequential circuit elements in the circuit design that can be ignored during clock skew minimization, wherein said identifying includes identifying sequential circuit elements in the circuit design whose data pins have a sufficiently large slack so that clock skew is not expected to cause timing violations at any of the data pins;
   the computer generating CTS exceptions based on the identified set of sequential circuit elements; and
   the computer creating circuitry based on the CTS exceptions that distributes a clock signal to one or more sequential circuit elements in the circuit design.

2. The method of claim 1, wherein said identifying includes identifying sequential circuit elements in the circuit design whose clock skew cannot be balanced with other sequential circuit elements due to structural reasons.

3. The method of claim 1, wherein said identifying includes identifying sequential timing elements in the circuit design that do not have a timing relationship with other sequential timing elements in the clock tree.

4. A non-transitory computer-readable storage medium storing instructions that, when executed by a computer, cause the computer to execute a method for generating clock tree synthesis (CTS) exceptions for a circuit design, the method comprising:
   identifying a set of sequential circuit elements in the circuit design that can be ignored during clock skew minimization, wherein said identifying includes identifying sequential circuit elements in the circuit design whose data pins have a sufficiently large slack so that clock skew is not expected to cause timing violations at any of the data pins;
   generating CTS exceptions based on the identified set of sequential circuit elements; and
   creating circuitry based on the CTS exceptions that distributes a clock signal to one or more sequential circuit elements in the circuit design.

5. The non-transitory computer-readable storage medium of claim 4, wherein said identifying includes identifying sequential circuit elements in the circuit design whose clock skew cannot be balanced with other sequential circuit elements due to structural reasons.

6. The non-transitory computer-readable storage medium of claim 4, wherein said identifying includes identifying sequential timing elements in the circuit design that do not have a timing relationship with other sequential timing elements in the clock tree.

7. An apparatus, comprising:
   a processor; and
   non-transitory computer-readable storage medium storing instructions that, when executed by the processor, cause the apparatus to execute a method for generating clock tree synthesis (CTS) exceptions for a circuit design, the method comprising:
      identifying a set of sequential circuit elements in the circuit design that can be ignored during clock skew minimization, wherein said identifying includes identifying sequential circuit elements in the circuit design whose data pins have a sufficiently large slack so that clock skew is not expected to cause timing violations at any of the data pins;
      generating CTS exceptions based on the identified set of sequential circuit elements; and
      creating circuitry based on the CTS exceptions that distributes a clock signal to one or more sequential circuit elements in the circuit design.

8. The apparatus of claim 7, wherein said identifying includes identifying sequential circuit elements in the circuit design whose clock skew cannot be balanced with other sequential circuit elements due to structural reasons.

9. The apparatus of claim 7, wherein said identifying includes identifying sequential timing elements in the circuit design that do not have a timing relationship with other sequential timing elements in the clock tree.

* * * * *